US007140824B2

(12) United States Patent
Bucknell

(10) Patent No.: US 7,140,824 B2
(45) Date of Patent: Nov. 28, 2006

(54) TENSIONING HYDRAULIC NUTS

(75) Inventor: John Wentworth Bucknell, Indooroopilly (AU)

(73) Assignee: Curtiss-Wright Flow Control Corporation, Falls Church, VA (US)

( * ) Notice: Subject to any disclaimer, the term of this patent is extended or adjusted under 35 U.S.C. 154(b) by 133 days.

(21) Appl. No.: 10/699,948

(22) Filed: Nov. 3, 2003

(65) Prior Publication Data

US 2004/0165963 A1 Aug. 26, 2004

Related U.S. Application Data

(63) Continuation of application No. 09/914,346, filed as application No. PCT/AU00/00138 on Feb. 28, 2000, now abandoned.

(51) Int. Cl.
*F16B 31/00* (2006.01)
*F16B 31/04* (2006.01)

(52) U.S. Cl. .......................... 411/14.5; 411/14; 411/19

(58) Field of Classification Search .................. 411/14, 411/14.5, 19, 994, 434, 915–917
See application file for complete search history.

(56) References Cited

U.S. PATENT DOCUMENTS

| | | | | |
|---|---|---|---|---|
| 2,571,265 | A * | 10/1951 | Leufven | 411/434 |
| 3,083,042 | A * | 3/1963 | Collar | 285/93 |
| 3,117,485 | A * | 1/1964 | Jansen | 411/427 |
| 3,210,096 | A * | 10/1965 | Van Der Wissel | 285/115 |
| 3,424,080 | A * | 1/1969 | Pappas | 100/214 |
| 3,707,107 | A * | 12/1972 | Bieri | 411/423 |
| 3,797,336 | A * | 3/1974 | Howe | 81/125 |
| 3,886,707 | A * | 6/1975 | Heldt | 411/14.5 |
| 3,887,990 | A * | 6/1975 | Wilson | 29/450 |
| 4,177,999 | A * | 12/1979 | Raber | 411/542 |
| 4,182,215 | A * | 1/1980 | Green et al. | 411/434 |
| 4,280,274 | A * | 7/1981 | Filer | 29/726 |
| 4,346,920 | A * | 8/1982 | Dailey | 285/89 |
| 4,773,146 | A * | 9/1988 | Bunyan | 29/407.02 |
| 4,815,360 | A * | 3/1989 | Winterle | 92/255 |
| 4,854,798 | A * | 8/1989 | Snyder et al. | 411/434 |
| 5,046,906 | A * | 9/1991 | Bucknell | 411/432 |
| 5,092,635 | A * | 3/1992 | DeLange et al. | 285/334 |
| 5,137,408 | A * | 8/1992 | Junkers | 411/432 |
| 5,253,967 | A * | 10/1993 | Orban et al. | 411/432 |
| 5,263,997 | A * | 11/1993 | Parker et al. | 415/214.1 |
| 5,368,344 | A * | 11/1994 | Plangetis | 285/412 |
| 5,878,490 | A * | 3/1999 | Heinold et al. | 29/888.02 |
| 6,112,396 | A * | 9/2000 | Steinbock | 29/452 |

FOREIGN PATENT DOCUMENTS

| | | |
|---|---|---|
| EP | 0 748 671 | 12/1996 |
| EP | 0 797 012 | 9/1997 |
| GB | 0797012 A2 * | 9/1997 |

* cited by examiner

*Primary Examiner*—Robert J. Sandy
*Assistant Examiner*—Jeffrey A. Sharp
(74) *Attorney, Agent, or Firm*—Pearne & Gordon LLP

(57) ABSTRACT

A hydraulic tensioning system for nuts on studbolts has a puller bar and a puller buddy, which are coupled to the studbolt, and a bridge around the nut. The puller bar is internally coupled to the studbolt (and may engage the nut before the tension is applied). The nut can comprise a cone nut, which cooperates with a complementary collar or shell with a conical inner face and a spherical base washer.

24 Claims, 14 Drawing Sheets

TENSIONING HYDRAULIC NUTS

This application is a continuation of application Ser. No. 09/914,346, filed Aug. 27, 2001, and now abandoned, which claims priority under 35 USC 371 from International Application Serial Number PCT/AU00/00138, filed Feb. 28, 2000, and Australian Application Serial Number PP 8905, filed Feb. 26, 1999.

BACKGROUND OF THE INVENTION

1. Field of the Invention

THIS INVENTION relates to hydraulic systems for tensioning fasteners; to nuts to be tensioned thereby; to tools to be used therewith; to washers and to other like type structures and accessories for use therewith.

2. Prior Art

Hydraulic nuts are known. The specification to Australian Patent No. 625495 (AU-B-25403/88), to the present applicant, describes such a nut. These nuts find applications in a variety of fields, for example in the assembly of turbine casings.

Power industry turbine casings are invariably in two halves, joined axially to make an essentially symmetric shell in which the turbine rotor operates. The joint between the casings must be clamped with sufficient force to withstand the massive forces of separation generated by the action of steam under pressure within, and with a high degree of consistency to prevent leakage or distortion of the casing. Steam turbines operate of necessity at high temperatures, so the nature of the material used in the bolts must resist creep (slow relaxation) under such conditions. This rules out using particularly high-strength heat treated alloy fasteners, so the engineering solution taken is that of using studbolts of large cross sectional area at reduced separation (bolt pitch). This reduced separation means that there is very little working room around the bolts. This creates problems in applying the high torque necessary to provide required tensile load in the member. Most turbine manufacturers have, therefore, opted to recommend a practice of heat induced elongation and subsequent shrinkage of the individual studs for casing bolt tensioning. This is an extremely costly method in the amount of time consumed, and it also has detrimental effects on the integrity of the fasteners.

There has been considerable pressure applied by power generation utility companies to the manufacturers of the turbines to improve the methods used in this area. An "outage" of a baseline generator, in a nuclear plant for example, can cost a considerable sum (in excess of four million dollars) per day. There are economic reasons to improve performance. The utility companies are of the opinion that permanently installed hydraulic fasteners are the ideal method of force application for these studbolts. However, there are design changes necessary to best fit such equipment requiring manufacturers and regulatory body approvals, so they have requested an interim step which would still allow the use of hydraulic tensioning without major design change. Ideally, they would use such equipment as tools which are removed after application, and which do not require replacement of the studbolts themselves.

SUMMARY OF THE INVENTION

Following experience gained in the development of high temperature hydraulic nuts for the power generation industry, the inventor proposes herein solutions to inherent problems of tensioning fasteners which are applied in circumstances offering limited working geometries such as fasteners used in fixing turbine casings.

It is an object of the present invention to provide one or more improvements and developments which address the above issues. In particular, a preferred object of the invention is to produce an hydraulic bolt tensioner and accessories therefor which can apply high tensile forces in very confined spaces. Various other objects and particular advantages will hereinafter become apparent.

Throughout the specification, the term "studbolt" shall include bolts and other fasteners.

The invention provides, in a first aspect, an hydraulic tensioner for application with a studbolt fitted with a nut, said tensioner having, including or comprising:

a puller bar for engagement in an internal thread with the studbolt;

a puller buddy for engagement with an external thread on the studbolt and with the puller bar, to work with an hydraulic means acting via a bridge around and/or over a nut and against the puller bar to tension the studbolt.

In a second aspect, the present invention resides in a hydraulic tensioner for a studbolt or similar, fitted with a nut, extending from an article or machine, said tensioner including or comprising:

a puller bar for engagement in an internal thread in an end of the studbolt;

a bridge extending around and/or over the nut, engageable with the article or machine; and hydraulic means between the puller bar and bridge and operable to cause the puller bar to tension the studbolt by pulling the one end of the studbolt in a direction away from the article or machine.

Preferably, the hydraulic tensioner further includes a puller buddy engageable with an external thread about the one end of the studbolt and engageable with the puller bar.

Preferably, the internal thread in the studbolt is stepped in diameter and the puller bar has a threaded end with complementary stepped external threads.

Alternatively, the internal thread in the studbolt is substantially conical or tapered; and the puller bar has a thread end with a complementary substantially conical or tapered external thread.

Preferably, the internal thread on the studbolt and the external thread on the end of the puller bar are of tapered buttress threads.

Preferably, the shoulders of the buttress threads are at an angle of approximately 10° (to the normal to the horizontal axes of the studbolt and puller bar). i.e., the threaded end of the puller bar has a 10° taper.

Preferably, the pitch of the external thread on the puller bar is greater than the pitch of the internal thread in the studbolt.

Preferably, the pitch of the external thread on the puller bar is 100.1% to 100.5% of the pitch of the vertical thread in the studbolt.

Preferably, the pitch of the external thread on the puller bar is 3.005 mm; and the pitch of the vertical thread in the studbolt is 3.00 mm.

In a third aspect, the present invention resides in a coupling for the hydraulic tensioner of the type as hereinbefore described wherein:

the internal thread on the studbolt and the external thread on the end of the puller bar are of tapered buttress threads.

Preferably, the shoulders of the buttress threads are at an angle of approximately 10° (to the normal to the horizontal axes of the studbolt and puller bar).

Preferably, the pitch of the external thread on the puller bar is greater than the pitch of the internal thread in the studbolt.

Preferably, the pitch of the external thread on the puller bar is 100.1% to 100.5% of the pitch of the vertical thread in the studbolt.

Preferably, the pitch of the external thread on the puller bar is 3.005 mm; and the pitch of the vertical thread in the studbolt is 3.00 mm.

Preferably, the profile of the buttress type thread is that having an exaggerated thread root radius.

In a fourth aspect, the invention further provides a nut with particular attributes suited to working with the aforesaid hydraulic tensioner having, including or comprising a nut body with a substantially conical or tapered peripheral surface, an annular shell with a complementary conical or tapered recess to receive the nut body, in use, the nut body being screwed, in use, on a studbolt into the recess of the annular shell.

In a fifth aspect, the present invention provides a nut assembly for use with the hydraulic tensioner as hereinbefore described, the nut assembly having, including or comprising:

a nut body with a substantially conical or tapered peripheral surface;

an annular collar or shell with a complementary conical or tapered recess to receive the nut body, in use; and the nut body being screwed, in use, on the studbolt into the recess of the annular collar or shell.

Preferably, the nut assembly further includes a base washer having a substantially part-spherical face engageable by a complementary part-spherical face on the annular collar or shell to enable the base washer and annular collar or shell to be self-aligning.

The invention still further provides, in a sixth aspect, a washer ideally suited for use with the aforesaid tensioner and/or conical nut, said washer having, including or comprising first and second annular means mating at a slip plane angled from the plane transverse to the axis of the washer, and removable or releasable means holding the first and second annular means against relative slip over the slip plane therebetween whilst the removable or releasable means is in place.

BRIEF DESCRIPTION OF THE DRAWINGS

The invention will now be described with reference to various preferred embodiments, seen in greater detail in the accompanying drawings in which.

DESCRIPTION OF THE PREFERRED EMBODIMENTS OF THE INVENTION

Figure 1:
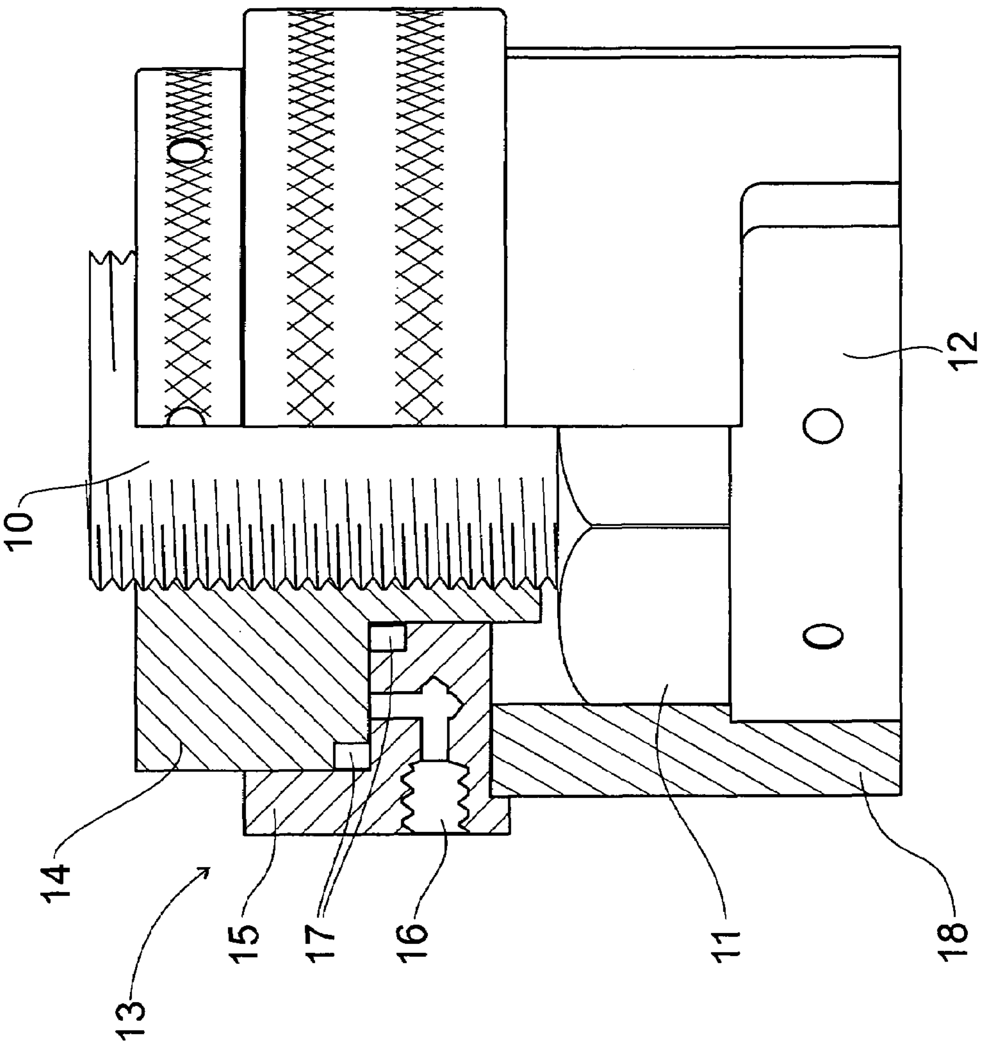
FIG. 1 (PRIOR ART)
FIG. 1 illustrates a prior art approach to tensioning a nut on a studbolt.

FIG. 1 illustrates a known approach to the above stated problem which uses a bridge to go over the nut. The studbolt 10 is fitted with a nut 11, fitted with a nut rotator 12, having holes enabling engagement of the nut rotator which a suitable tool to turn it. Above the nut 11 is an hydraulic assembly 13 comprising a piston member 14, threadably engaged on stud 10 and extending down into a cylinder member 15, the two members 14, 15 working together with an expansion chamber therebetween, into which chamber may be charged an hydraulic fluid under pressure (via charge port 16) the expansion chamber being sealed at 17 in a manner known to those skilled in the art. This type of structure is seen in the prior Australian patent specification referred to above. The cylinder member 15 of the hydraulic assembly is worked against a bridge 18, standing over the nut 11. Expansion of the hydraulic assembly 13 expands the assembly, tensioning the studbolt 10 to allow the nut rotator 12 to be rotated to tighten the nut. After the nut 11 is screwed firmly against the face of the element being held by the studbolt 10, the hydraulic pressure may be relieved and the hydraulic assembly 13 can be removed from the studbolt 10, which therefore remains in tension. Clearly, the dimensions of the applied hydraulic assembly 13, in directions transverse to the studbolt 10, will be limited by the degree of spacing between neighbouring studbolts 10.

The prior art practice described above is mounted over the nut 11, with a bridge 18 as illustrated, the bridge 18 allowing access for rotation of the nut 11 within. Clearly, when there is little room between adjacent studs 10 and nuts 11, the bridge 18 must be thin walled, and it will apply high bearing stresses upon the joint face when operating. In practice, the nuts 11 are so close as to almost touch, which also means that the distance between the closest interference and diameter of any studbolt 10 does not allow for much annular area in the tensioner. Bolt tensioners have been constructed which have required the use of an extended studbolt to get above the spatial restrictions. If used as a replacement fitting, then all the studbolts will have to be changed and the turbine insulating covers altered at considerable cost of, in typical circumstances, $1.5 to $2 million per machine.

The above studbolt is by definition of the same strength as original equipment, so the connection with the bolt tensioner therefore cannot be reduced in diameter to allow the bolt tensioner tool to have more interior annular pressure area. This means that the tensioner is required to have several load cells (in a stacked configuration known to those skilled in the art) and even longer stud length to accommodate same. The resulting tensioners made by others in this area are therefore huge items requiring special studs with modifications to the machine and cannot be used in close proximity. They would interfere badly if used on consecutive studs.

With the aforementioned in mind, the inventor has designed the herein described hydraulic bolt tensioner and accessories which can be produced in a form which is comparatively very small, yet still provides high tensioning forces within the existing spotface dimensions of turbine casings. As a consequence, these items may therefore be used on every casing bolt simultaneously, which is a massive boost to productivity. The inventor proposes a modification to existing studbolts 10 to adapt them to this system. As best practice, the inventor proposes to replace existing nuts 11 with a companion development, a mechanical superior type nut 21 having better thread load distribution characteristics. Another particular development is a washer 24 by which the tension in a studbolt may be relieved.

A nut 20 which is proposed below may be a three-part assembly, being a fitted substantially cone shaped member 21, or equivalent; and collar-like member 23, preferably resting on, typically, a spherical base washer 24. In a preferred form (see below), the cone nut 21 may have a gear 22 cut into its outer diameter to enable or allow its rotation during tensioning (see, e.g., FIG. 18).

Figure 3:
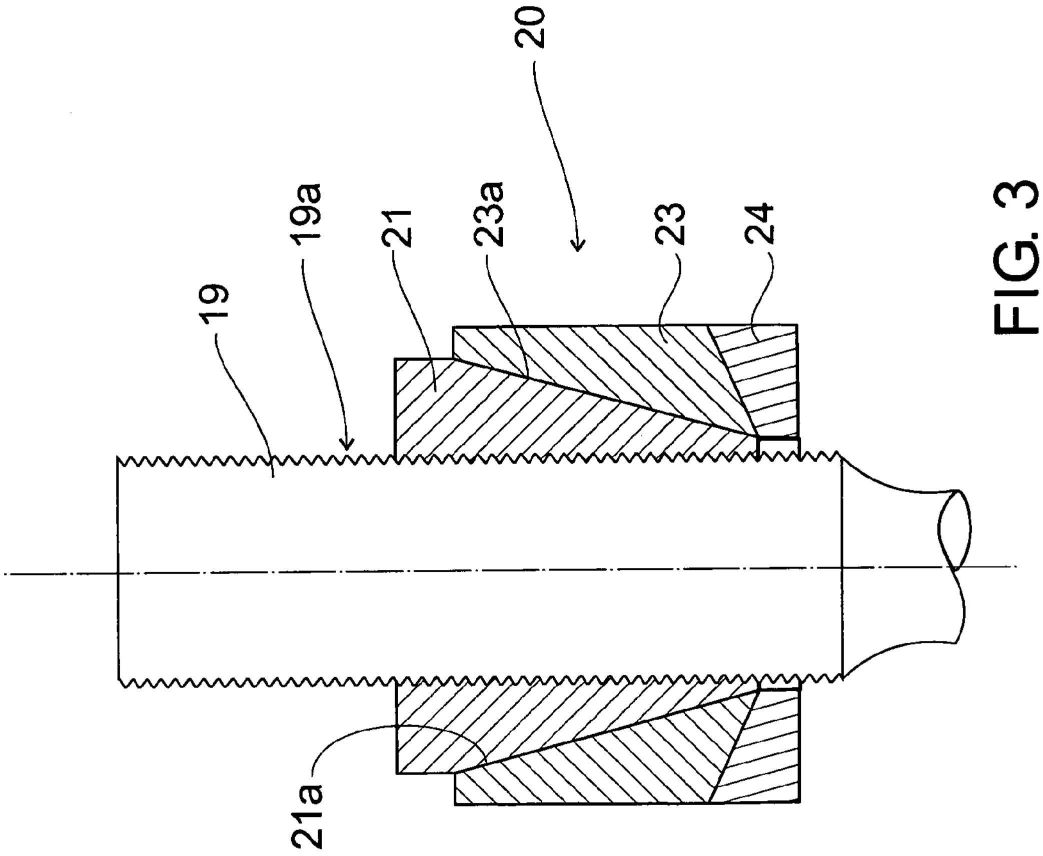
FIGS. 2 and 3 are plan and vertical sectional views of a nut in accordance with the invention.
Figure 2:
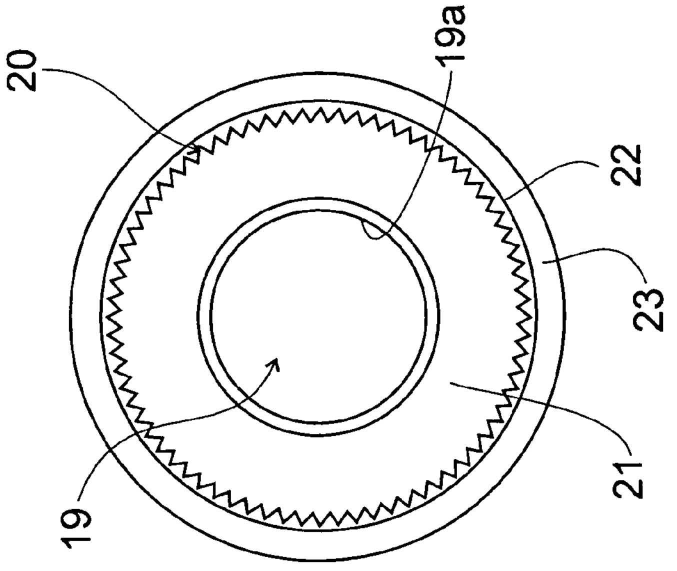
Figure 4:
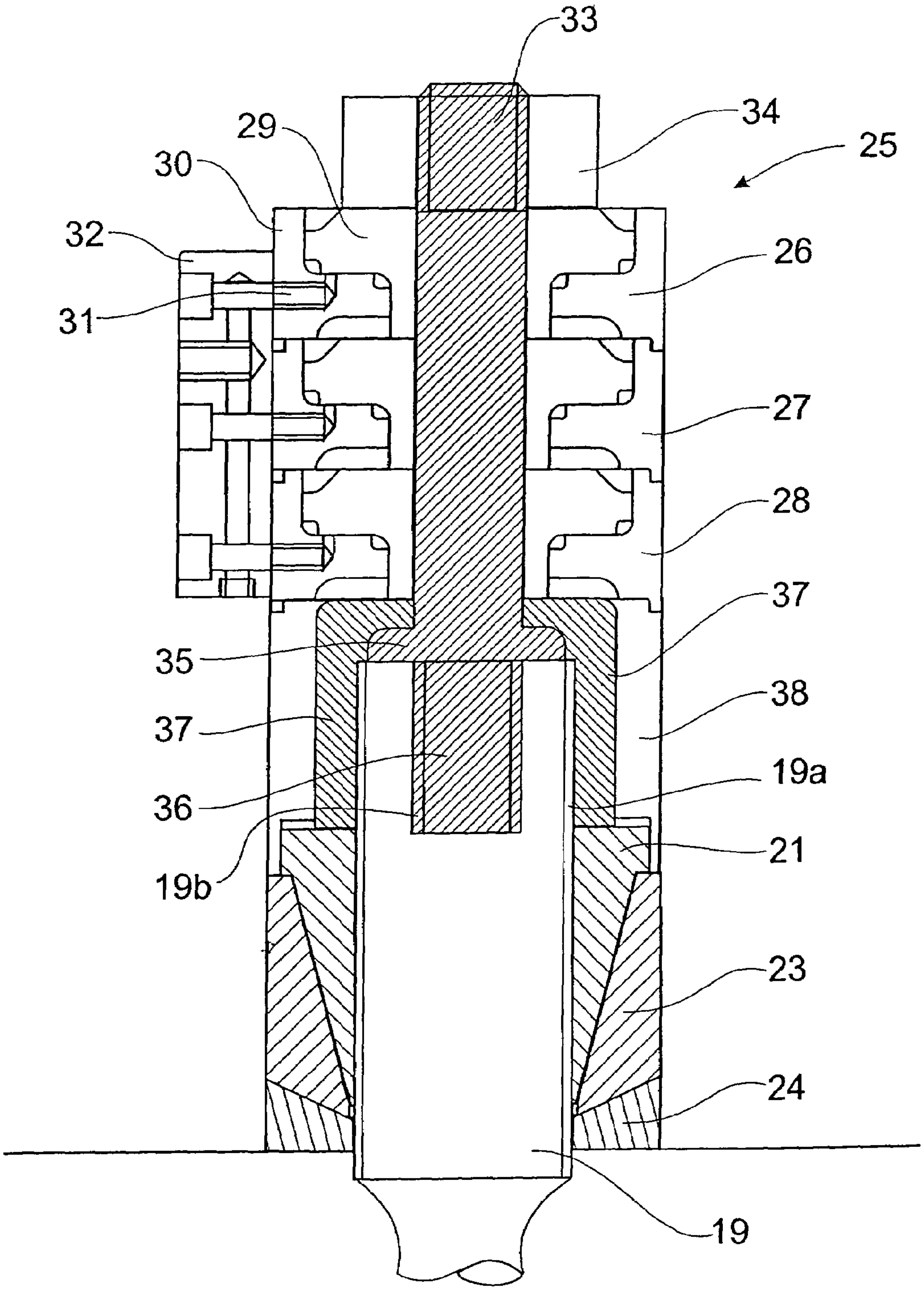
FIG. 4 is a vertical section through an hydraulic tensioner mounted to a nut of the kind seen in FIGS. 2 and 3.

In FIGS. 2, 3 and 4, there is illustrated a development in accordance with the present invention. The studbolt 19 may have an external thread 19*a* to which can be applied a nut structure 20 incorporating the cone nut 21 and an hydraulic tensioning assembly 25 in accordance with the invention. The hydraulic assembly 25 may involve multiple load cells, eg., three in this example numbered as 26, 27, 28, each with a respective piston and cylinder such as 29 and 30, as shown for load cell 26, and each with a charge port 31 in the case of load cell 26. (The charge ports 31 are connected to a manifold 32.) The load cells 26, 27, 28 work upwardly against a bar nut 34 on a tension transmitting member 33, hereinafter referred to as a "puller bar", which extends downwardly, centrally of the load cells 26–28 to (optionally) a threaded end 36 which may screw-threadably engage a complementary bore in studbolt 19. The puller bar 33 may have an engagement face or shoulder 35, acting with or working against an intermediate load transmitting means, hereinafter called a "puller buddy" 37, screw-threadably or otherwise engaged to an external thread (in this example) on the studbolt 19. Together, the puller bar 33 and puller buddy 37 co-operate to tension the studbolt 19. The hydraulic assembly 25 extends downwardly, past the cone nut 21, preferably via a bridge 38, which may sit atop the shell 23, acting or working thereby against washer 24 in the process of tensioning the studbolt 19. Elongation resulting from tensioning of the studbolt 19 by action of the tensioning assembly 25 on the studbolt 19 can be taken up by rotation of the cone nut 21.

The above illustrates the means by which high tensile loads may be applied without damaging the threads 19*a* of engagement of the studbolt 19, or exceeding the spotface dimensions allowable for each size. A tensioner assembly 25 manufactured as illustrated may produce a tensile force of 50 tons/in$^2$ on a 2" Studbolt. The arrangement shown allows the load applied by the puller bar 33 on the inner threads 19*b* of the studbolt 19, and the load applied by the puller buddy 37 on the outer threads 19*a* to be distributed between the respective threads of engagement during tensioning. The force which can be delivered may only be limited by the tensile strength of that sectional area of the studbolt 19 which is subject to said force. This can be maximised by manipulating the actual point of application of load via inner and outer threads 19*b*, 19*a*. For example, if the inner bar were shorter as illustrated and the puller buddy 37 picked up load in full thickness of the studbolt 19 as per the illustration, full load can then be distributed across the section in a very favourable manner.

Figure 5:
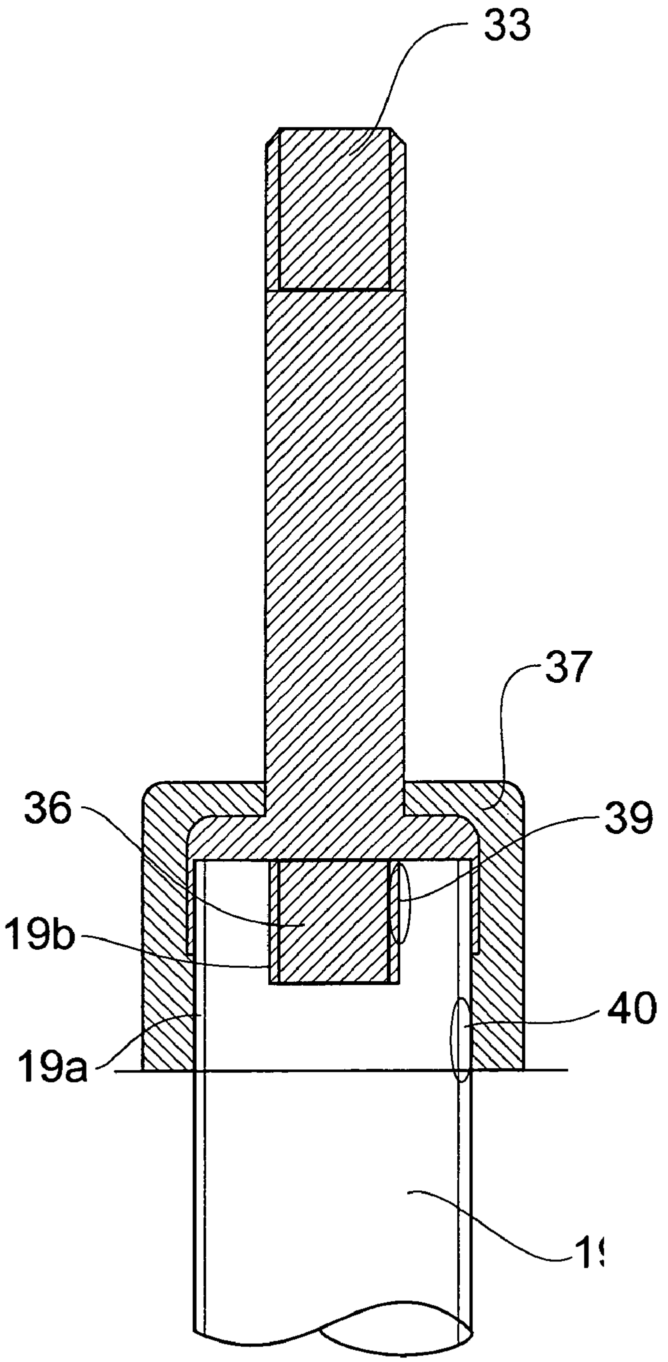
FIG. 5 is a view of a detail in FIG. 4.

FIG. 5 shows the studbolt 19, puller bar 33 and puller buddy 37 of FIG. 4. The relative extent of the thread of the threaded end 36 of the puller bar 33, in the inner threads 19*b* of the studbolt 19, and the puller buddy 37 on the outer threads 19*a* of the studbolt, can be arranged to produce load concentrations 39, 40, as discussed above.

The inventor has also designed variations of the puller/buddy tensioner which do not rely on the use of the cone type nut. As illustrated (see discussion below), the operative strength of a hex nut is governed by its minimum wall thickness. The proposal here can make use of the difference in Across Flats and Across Corners dimensions of hex nuts to mount a bridge directly onto a modified spherical washer at full spotface dimensions. There may be sufficient stud protrusion above the joint to fit a Ring Nut, and after tensioning is complete, a Cap Nut can be screwed onto the top to protect the thread.

Figure 7:
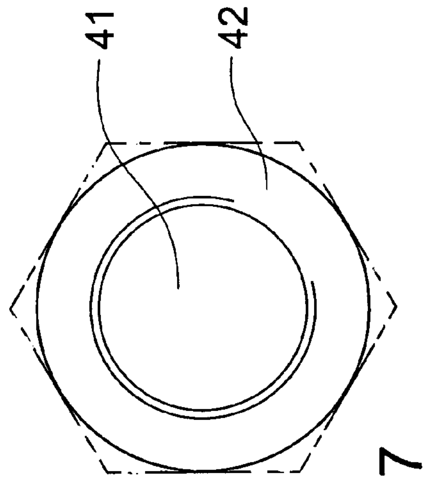
FIGS. 6 to 8 are vertical section, plan and sectional detail of another hydraulic tensioner in accordance with the invention.
Figure 8:
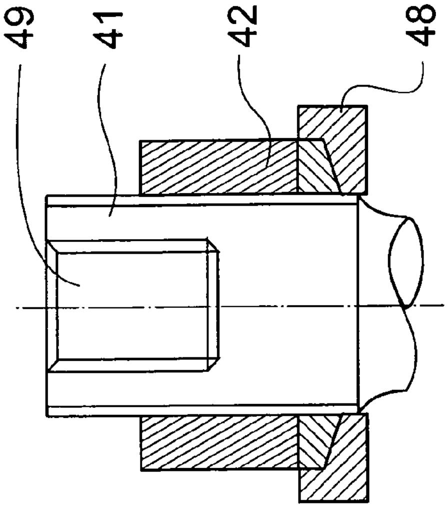
Figure 6:
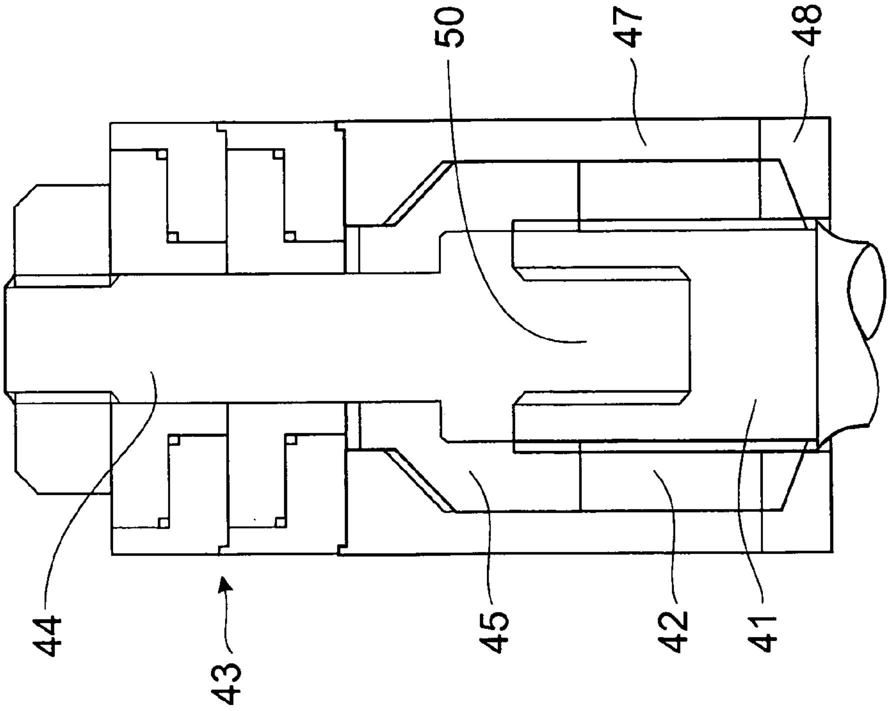

FIGS. 6 to 8 show an assembly of the kind in FIG. 4 applied to a system not using a cone nut. In this embodiment, a studbolt 41 is fitted with a nut 42 with an hydraulic assembly 43 (equivalent to hydraulic assembly 25 of FIG. 4) to tension the stud 41 via a puller 44 and a buddy 45. The assembly 43 acts down via bridge 47 to washer 48. The assembly 43 may be removed after tensioning and tightening of the nut 42 with the exposed end of the stud 41 as seen in FIG. 8 fitted with a protective cap (not shown). The nut 42 is a round nut of just sufficient thickness to hold the load. In FIG. 7 is seen the round nut 42 with its equivalent hex nut shown in dotted outline. There is a saving in overall diameter by moving away from the hex nut structure leading to more room to work with when applying tensioners to studbolts.

As part of a total package for Turbine Tensioning Systems the inventor has developed a device designed to replace the torch ring often used where it is considered quicker to release clamp force by cutting and removing a piece of the assembly. It is difficult to advocate the use of sacrificial parts and oxy cutting thereof around multi-million dollar hardware, so the inventor proposes the use of a "friction washer" 51 which can be released voluntarily.

Figure 9:
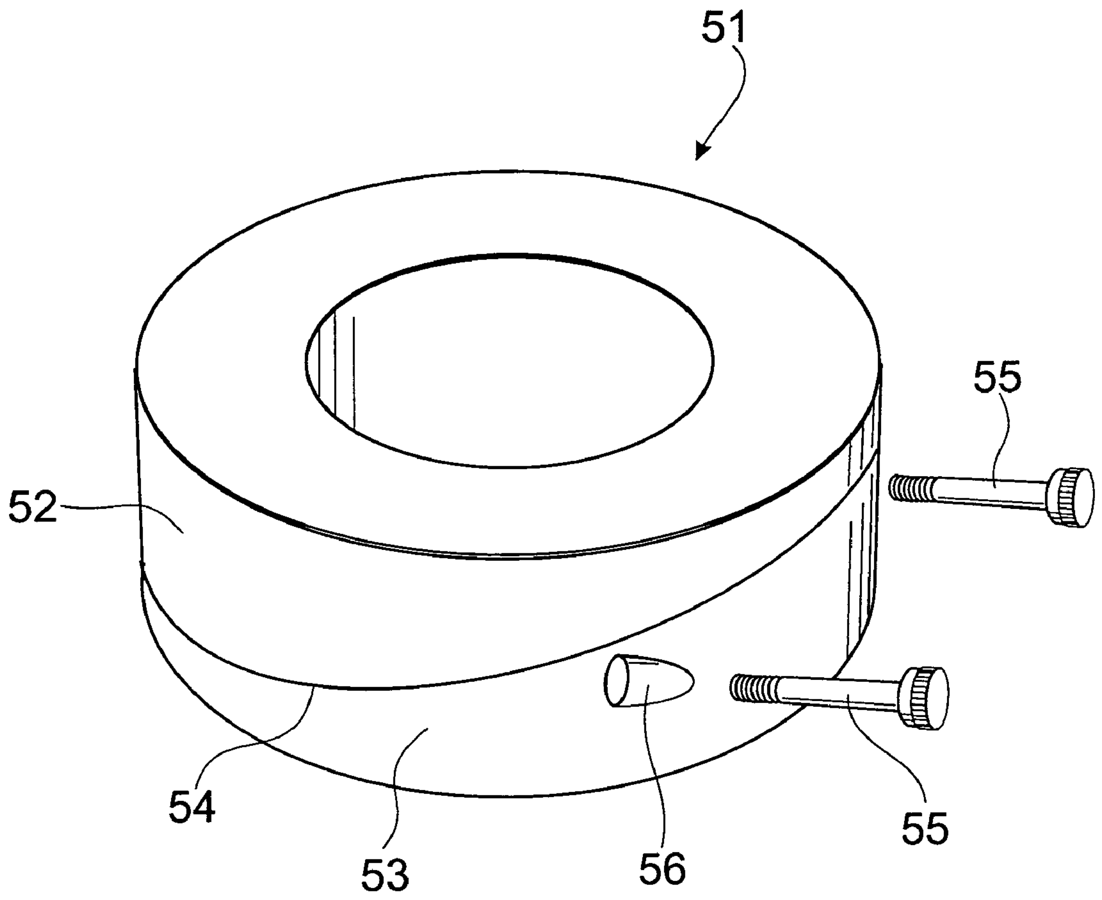
FIG. 9 is a view of one embodiment of a washer in accordance with the invention.

FIG. 9 illustrates a friction washer in accordance with the invention. The washer 51 is in two parts or halves 52, 53, mated across sloped surfaces at line 54. The two parts 52, 53 held in position by bolts 55 in holes 56 and threads (not shown) in part 52. When a nut is to be released, the bolts 55 may be removed and a tap with a hammer can cause slip over plane 54 to release tension. The friction washer 51 is loaded by the compressive force applied to the joint and two halves 52, 53 are held together by friction. The degree of slope is chosen to enable slip when the washer 51 is given a jolt after the retaining bolts or the wedges (see below) are removed.

The above friction washer 51 is a simple yet effective device in which the friction between the opposing faces holds the washer together as a function of the force exerted downwards by the bolt tension. As the relationship is essentially linear, then the correct slip plane angle can be determined from those inherent factors and the co-efficient of friction of the base material. It is set so that when the bolt is under tension, the capscrews will provide force just sufficient to hold the assembly together. Remove the capscrews, and apply a light blow to overcome sticking friction, and the washer separates along the slip plane. Design of the washer can be varied.

Figure 10:
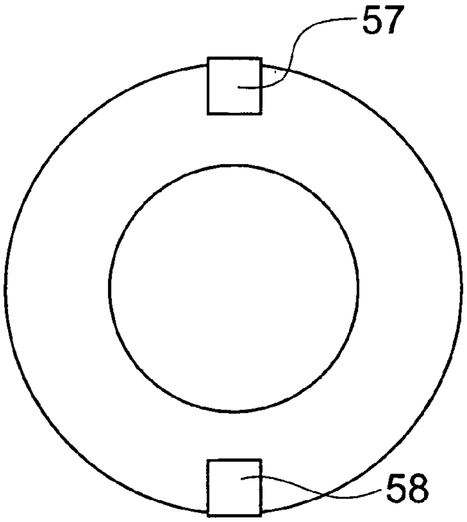
FIGS. 10 to 12 are views of alternate embodiments of washers for use with the invention.
Figure 11:
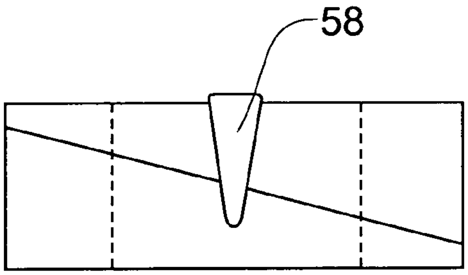
Figure 12:
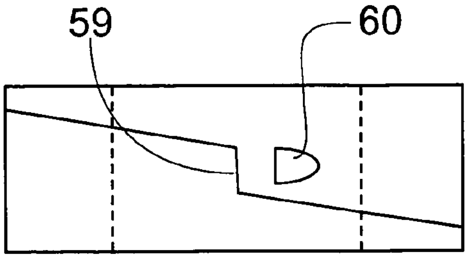

In FIGS. 10 to 12 are shown variations of the slip washer of FIG. 9. In FIGS. 10 and 11, the two parts are held by keys 57, 58 or small wedges which may be removed to allow slip of the two sections. In FIG. 12, the slip plane is stepped at 59 to allow easy assembly with bolts fed into holes such as 60 extended through the shoulder. For those with lingering doubts about removal of bolts under high tensile load, then these offer great reassurance. In practice, there may be so much removal time saved that they could become valuable in applications not utilising the other features of the presently set out system.

Figure 15:
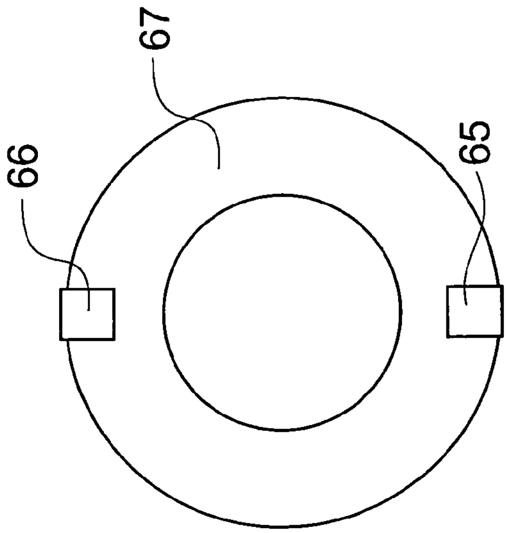
FIGS. 13 to 16 show yet further embodiments for washers in accordance with the invention.
Figure 16:
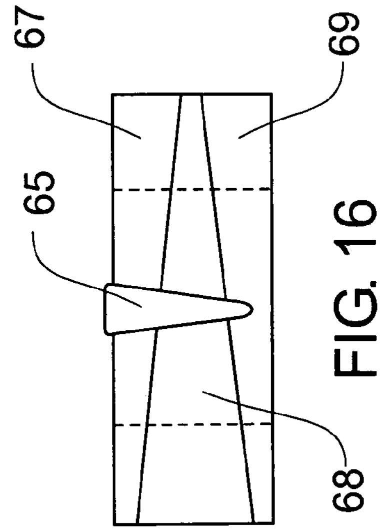
Figure 13:
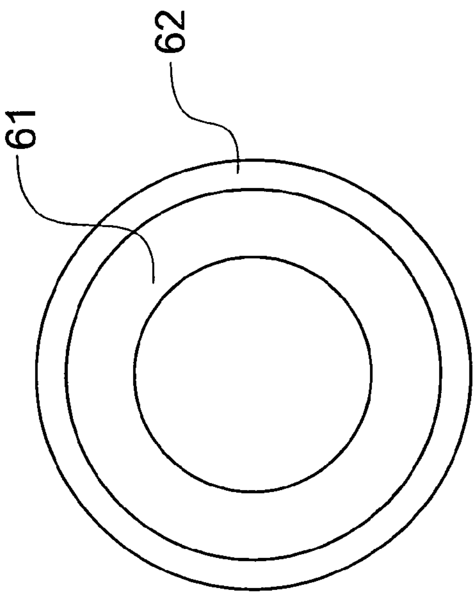
Figure 14:
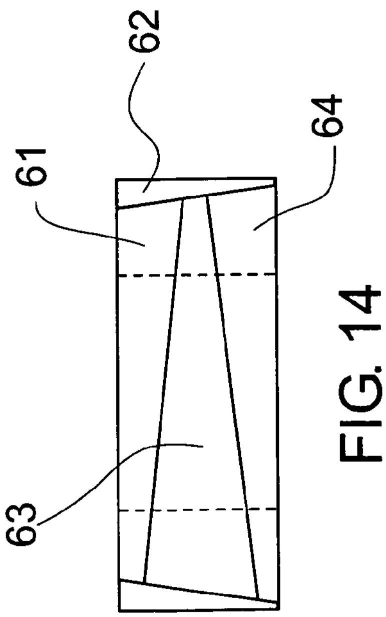

FIG. 13 illustrates a plan view of a washer fitted with an annular locking ring 62. The washer may be formed in a number of sections meeting at slip planes and three are seen in the drawing. The washer and ring is shown in transverse section in FIG. 14. In FIG. 14, the washer is a three part construction with sections 61, 63, and 64 mating together at opposed sloping slip planes. The locking ring 62 holds the assembly together during installation. The locking ring 62 can be removed to enable displacement of the sections. In FIGS. 15 and 16 is shown a three part assembly in which the washer sections 67, 68 and 69 are held together by wedges 65, 66.

Figure 18:
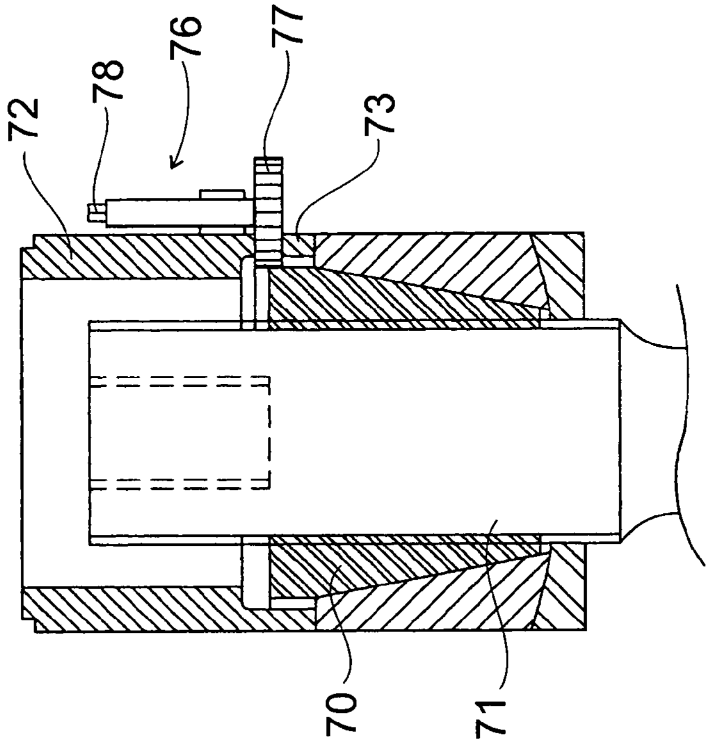
FIGS. 17 and 18 show detailed views of mechanisms for rotating the nuts employed in tensioning systems in accordance with the invention.
Figure 17:
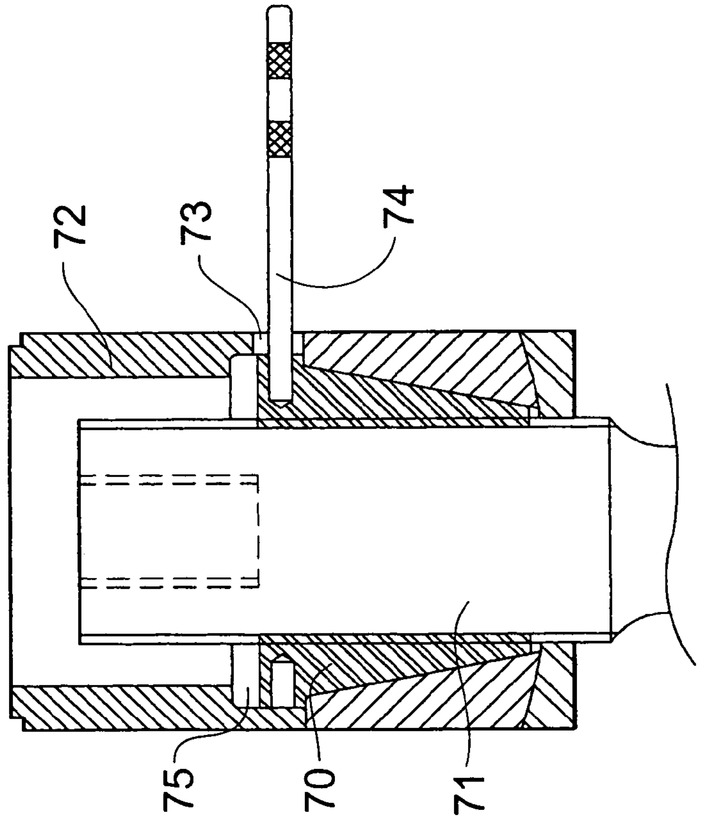
Figure 20:
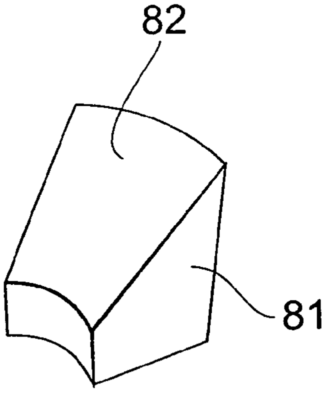
FIGS. 19 to 24 show additional embodiments for washers in accordance with the invention.
Figure 19:
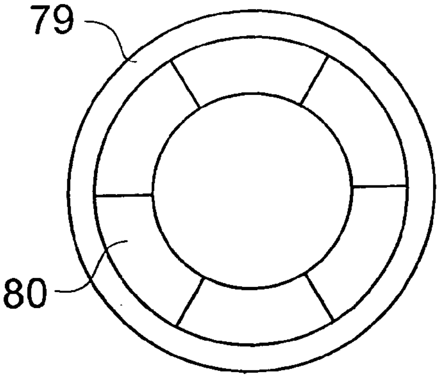
Figure 21:
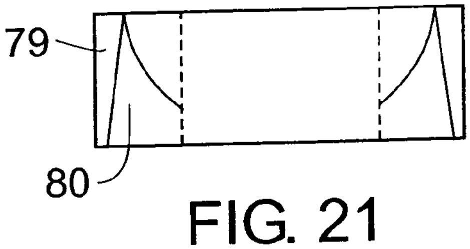
Figure 22:
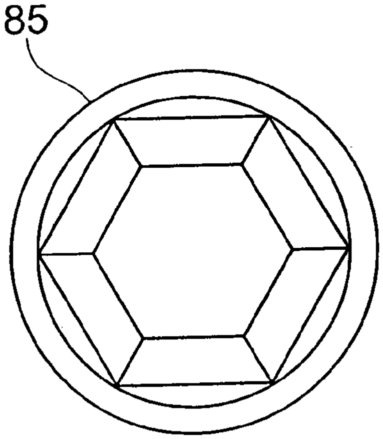
Figure 23:
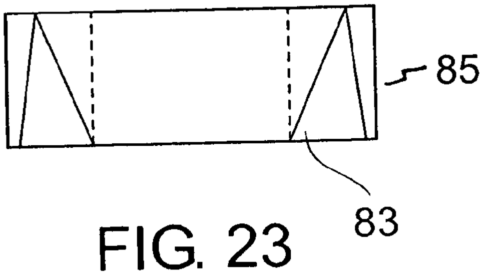

FIG. 17 shows in detail where a cone nut 70, on a studbolt 71, is turned by means of a tommy bar 74 engaged in a hole such as 75 via slot 73 in bridge 72. A variation is shown in FIG. 18. In FIG. 18, the cone nut 70 is rotated by a gear assembly 76, with gear 77 engaged with a cone nut 70. The gear assembly 76 is rotated by application of a suitable driver at 78.

Figure 24:
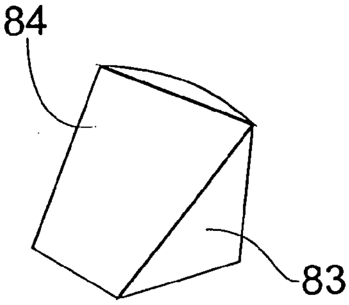

In FIGS. 19 to 24 are illustrated variations of the above described washers, wherein a lock ring 79, 85 holds segment pieces such as 80 which together act as a washer. Removal of the locking ring 79 releases them to release the load. The segment piece 81 of FIG. 20 may have a conical face 82. The piece 83 of FIG. 24 is formed with a flat face 84 which come together with locking ring 85 to form the assembly of FIG. 22.

Figure 25:
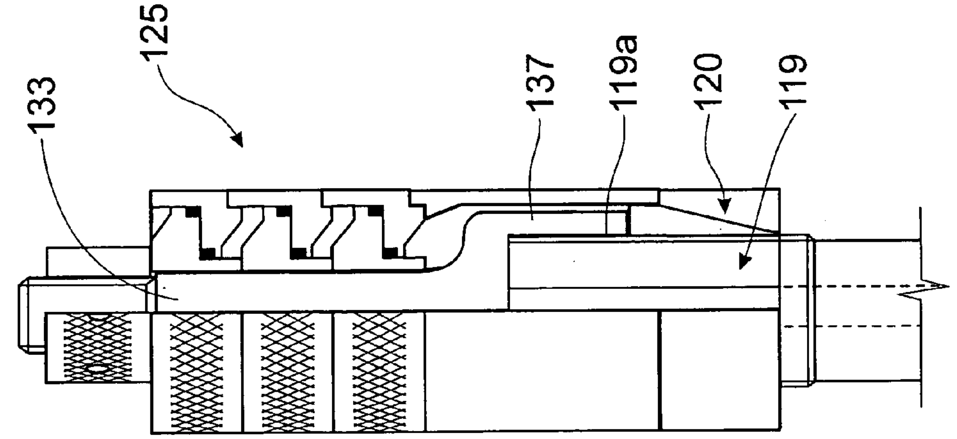
FIG. 25 is a vertical sectional view showing one embodiment of a coupling between tensioning means and the studbolt.

FIG. 25 shows an hydraulic arrangement where the hydraulic tension system 125 (corresponding to the system 25 of FIG. 4) has a puller bar 133/puller buddy 137 combination where there is no reduction in the diameter of the external threads 119*a* on the studbolt 119, the latter being fitted with a cone nut assembly 120.

Figure 26:
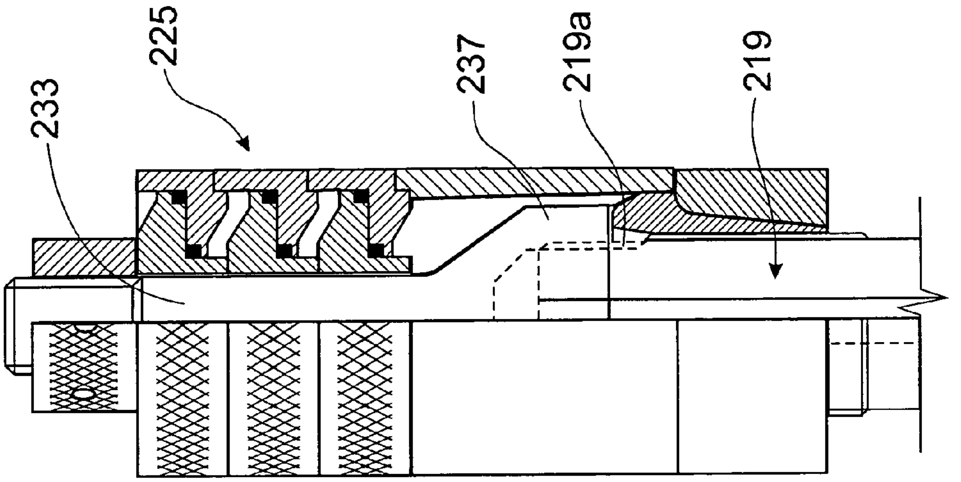
FIG. 26 is a similar view of a second embodiment of a coupling.

In FIG. 26, the puller bar 133/puller buddy 137 of the hydraulic tension system 225 co-operates with stud bolt 219 where the external threads 219*a* on the studbolt 219 are of reduced diameter.

Figure 27:
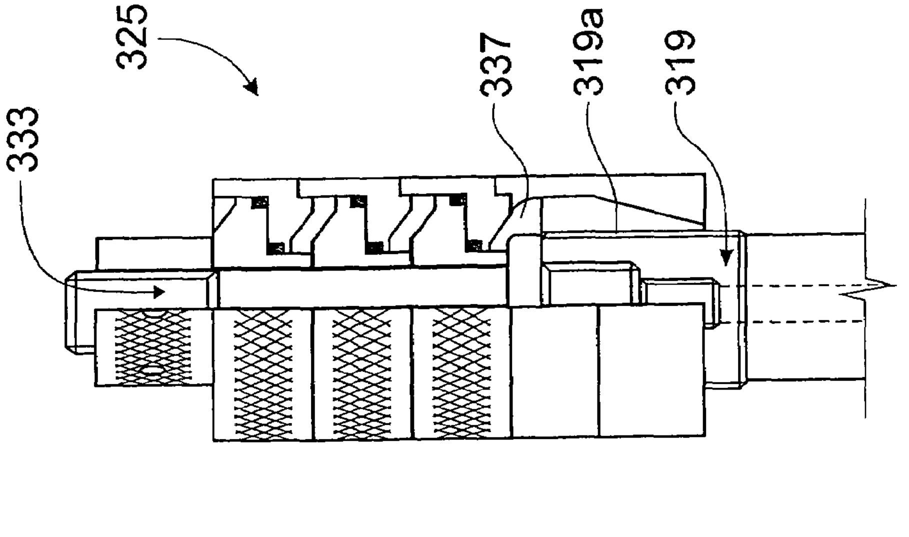
FIG. 27 is a similar view of a third embodiment of a coupling.

FIG. 27 shows a hydraulic tensioning system 325, where the puller bar 333 has a threaded end 336 divided into respective stepped diameter zones 336*a* and 336*b* (in the direction away from the abutment 335) to engage the internal threads 319*b* in a stepped bore in the studbolt 319. A puller buddy 337 is engaged with the external threads 319*a* on the studbolt.

Figure 29:
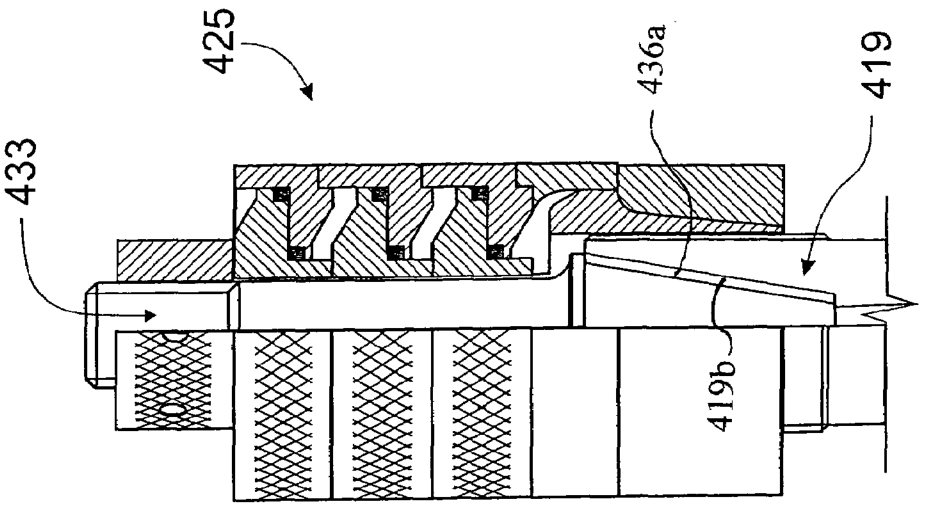
FIG. 29 is a vertical sectional view of a fourth embodiment of the coupling.
Figure 28:
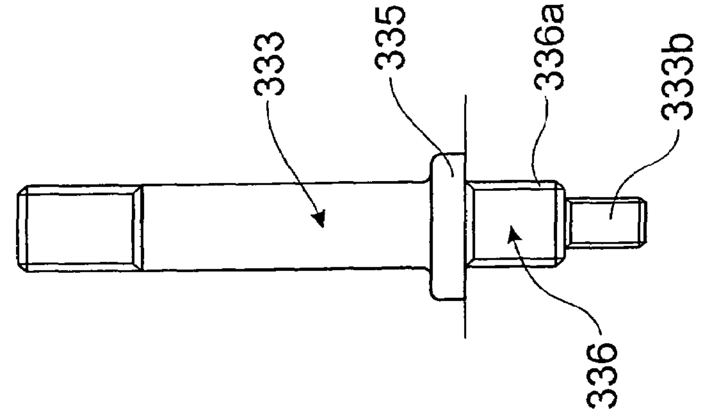
FIG. 28 is a vertical elevational view of the puller bar of FIG. 27.
Figure 30:
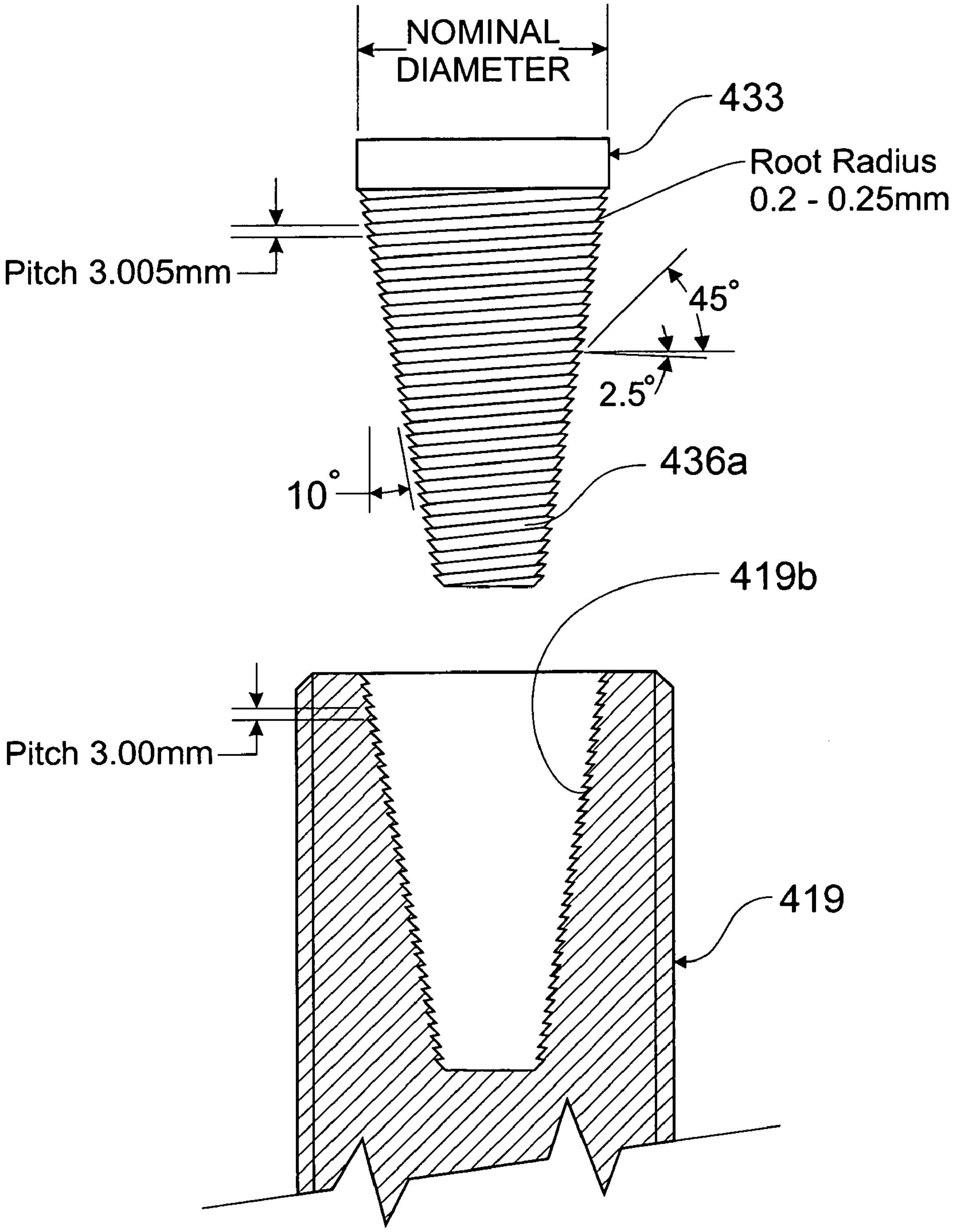
FIG. 30 is a sectional view of the threads of the coupling, on an enlarged scale.

FIG. 29 shows a more preferred coupling arrangement between the puller bar 433 (of the hydraulic tension system 425) and the studbolt 419, where the respective threads 436*a* (on the puller bar 433) and 419*b* (in the studbolt 419) are of complementary (substantially) conical configuration, as shown in enlarged scale in FIG. 30.

The hydraulic tensioning systems 225, 325, 425 correspond to the hydraulic tension system 225 of FIG. 4 and operate in like manner.

The inventor has examined various threaded connections for the tensioner/studbolt interface, and found that the simplest configuration having the best stress distribution is a 100 tapered buttress thread modelled on the standard API cone thread. Tapered cone styles with 60° threads have been around as connectors for tensile rods such as drill steels since the industrial revolution—downhole hammers used in drilling have a modified tapered buttress thread form, as do components of rock crushing equipment. The specific benefits of using this type of thread are resistance to loosening, quick breakout and the use of thin walled elements as the threadform does not generate significant radial thrust forces. The inventor has chosen to use a modified buttress with a slight overpitch (increased thread pitch) (eg., 3.005 mm) on the puller (relative to 3.00 mm on the studbolt) which gives a near-perfect load distribution on the threads. The shoulders of the buttress-form threads are essentially perpendicular to the pullers and bolts common axis, and therefore have no radial thrust.

Figure 31:
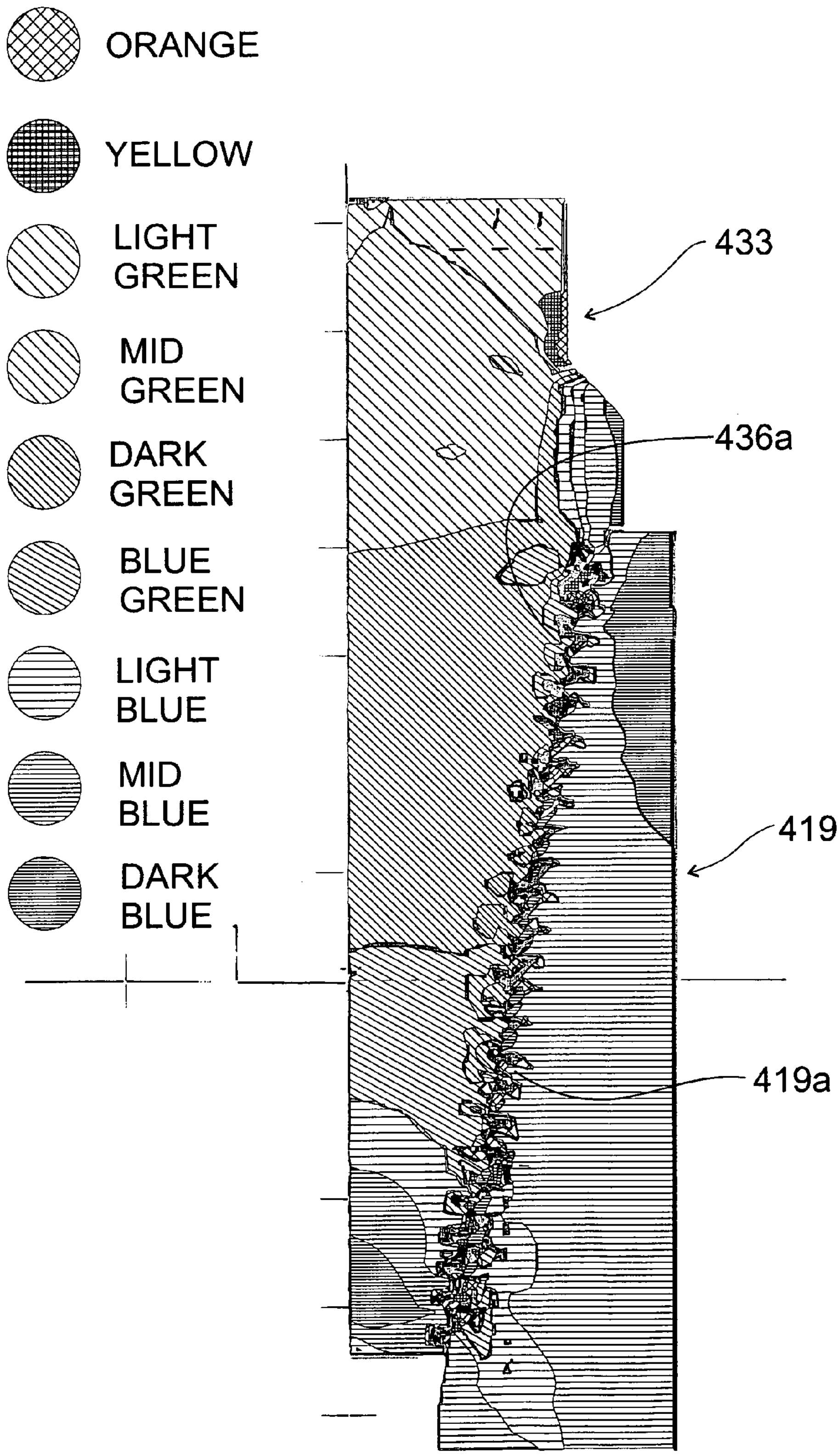
FIG. 31 is a sectional view showing the stress concentrations in the coupling of FIG. 30.

The inventor has designed a specific threadform for this application, as shown in FIG. 30. It has a very low face angle (eg., 2.5°) and exaggerated root radii (eg., 0.2–0.25 mm) to prevent stress concentrations common with generic forms. The more even stress concentration patterns in the components are illustrated by the stress concentration pattern shown in FIG. 31.

The cone nut assembly 20 can be specifically designed using computer modelling to obtain the best possible component shape to:

1. retain the highest proportion of load provided by the hydraulic mechanism when transferring that load to the nut assembly;
2. provide even loading of the threaded interface rather than the concentration of load found with standard nut/bolt connections.

This is preferably achieved by modelling the components' deflections during the complete operational cycle of the tensioner to determine the precise set of dimensions "pre-tensioning" which will give the ideal deflected shape "post tensioning". Obviously, the shape of various sections of components will alter during cycle, and the designer must know what shape to make them so that their compressed shape will allow optimised performance of the fasteners.

The operation of the "cone nut" assembly 20 is quite complex. After being screwed into position during hydraulic pump-up phase, when the pressure is relieved from the system, the upper nut part 21 (with internal cone face) is first put into tension, simply hanging off the upper face of engagement with the collar or cone outer 23. Then, as pressure relief continues, the load being transferred to the "cone nut" assembly 20 increases, the lower part of the thread radially deflects progressively upwards and contacts the adjacent tapered face of the collar. This action effectively dissipates the concentrations of load throughout the thread contact zone, therefore, limiting the radial thrust factor and associated losses of tensile load and bolt extension in the system.

The invention has been described with respect to preferred arrangements which relate to a task where it has ideal application. The scope of the invention is not limited to the embodiments and use hereto described, but also to a wide range of other applications which would be clear to those skilled in the art. Some examples would be for valves, flanges, pumps, compressors, engines and pressure vessels where components of such equipment are retained by tensile members.

What is claimed is:

1. A hydraulic tensioner for use in a high tensile force environment where space is limited, said tensioner applying tension to a studbolt extending from an article, said tensioner comprising:

a puller bar having a threaded end for threaded engagement with a threaded end of the studbolt;

hydraulic means for exerting a pulling force on the puller bar and thus the studbolt to apply tension to the studbolt;

a cone nut assembly for fitment to the studbolt in a position adjacent the article, said cone nut assembly comprising a nut body for threaded engagement on said studbolt and having a downwardly and inwardly substantially conical or tapered peripheral outer surface, and an outer annular collar radially surrounding said nut body with a complementary conical or tapered recess to receive most of the nut body, in use; and a bridge for extending around and over the nut body, operable to react between the hydraulic means and the article to tension the studbolt by a pulling force exerted by said hydraulic means on said puller bar to pull said end of the studbolt in a direction away from the article, said nut body being adjustable on the studbolt and against the tapered recess in the outer annular collar to take up elongation of the studbolt as a result of applying tension to it;

wherein, said bridge stands directly upon said outer annular collar in operation.

2. A hydraulic tensioner as claimed in claim 1, wherein:

the threaded end of the studbolt includes an internal thread; and the internal thread in the studbolt is stepped in diameter and the puller bar has a threaded end with complementary stepped external threads.

3. A hydraulic tensioner as claimed in claim 1, wherein: the bridge is engaged between the hydraulic means and the outer annular collar.

4. A washer for use between the cone nut assembly and article in the tensioner as claimed in claim 1, said washer comprising:

a first annular means and second annular means mating at a slip plane angled from a plane transverse to the axis of the washer; and removable or releasable means holding the first and second annular means against relative slip over the slip plane therebetween while the removable or releasable means is in place.

5. A hydraulic tensioner as claimed in claim 1, and further including:

a puller buddy engageable with said threaded end of the studbolt and engageable with the puller bar so that when the puller bar is moved to tension the studbolt, the puller buddy is also moved to tension the studbolt.

6. A coupling for the hydraulic tensioner of the type as claimed in claim 5 wherein:

the threaded end of the studbolt is an internal thread, and the threaded end of the puller bar is an external thread; and the internal thread on the studbolt and the externally threaded end of the puller bar are tapered, and comprise buttress threads.

7. A hydraulic tensioner as claimed in claim 1, wherein:

the threaded end of the studbolt includes an internal thread;

the internal thread in the studbolt is substantially conical or tapered; and the threaded end of the puller bar has a complementary substantially conical or tapered external thread.

8. A coupling for the hydraulic tensioner of the type as claimed in claim 7 wherein:

the internal thread on the studbolt and the external thread on the end of the puller bar are buttress threads.

9. A hydraulic tensioner as claimed in claim 7 wherein:

the internal thread on the studbolt and the externally threaded end of the puller bar are equally tapered, and the threads comprise buttress threads.

10. A hydraulic tensioner as claimed in claim 9 wherein:

the taper of the internal thread on the studbolt and the taper of the externally threaded end of the puller bar are at an angle of approximately 10° to the normal to the horizontal axes of the studbolt and puller bar.

11. A hydraulic tensioner as claimed in claim 10 wherein:

the pitch of the external thread on the puller bar is greater than the pitch of the internal thread in the studbolt.

12. A hydraulic tensioner as claimed in claim 11 wherein:

the pitch of the external thread on the puller bar is 100.1% to 100.5% of the pitch of the mating thread in the studbolt.

13. A washer for use with the tensioner as claimed in claim 12, said washer comprising:

a first and second annular means mating at a slip plane angled from the plane transverse to the axis of the washer; and removable or releasable means holding the first and second annular means against relative slip over the slip plane therebetween whilst the removable or releasable means is in place.

14. A coupling within a hydraulic tensioner for applying tension to a studbolt extending from an article and fitted with a nut and an outer annular collar radially surrounding said nut, wherein said tensioner comprises a puller bar for engagement with an end of the studbolt, hydraulic means acting between the puller bar and the article and operable to cause the puller bar to tension the studbolt by pulling said end of the studbolt in a direction away from the article, and a bridge extending around and over the nut for transmitting reactive force from the hydraulic means to the article, said bridge standing directly upon said outer annular collar, and wherein said coupling comprises:

an internally threaded bore in an end of the studbolt and a complimentary externally threaded end on the puller bar, said internally threaded bore and said externally threaded end being tapered at an angle of about 10° to a length axis of the studbolt, and said threads being substantially uniform and constant throughout their length and comprising buttress threads having a flank or shoulder facing away from the article and substantially perpendicular to the common axes of the studbolt and puller bar and a flank or face facing toward the article and oriented at an angle of about 45° to the length axis of the studbolt.

15. A washer for use between the nut and article in the tensioner as claimed in claim 14, said washer comprising:

a first and second annular means mating at a slip plane angled from the plane transverse to the axis of the washer; and removable or releasable means holding the first and second annular means against relative slip over the slip plane therebetween whilst the removable or releasable means is in place.

16. A coupling as claimed in claim 14 wherein:

the pitch of the external thread on the puller bar is greater than the pitch of the internal thread in the studbolt.

17. A coupling as claimed in claim 16 wherein:

the pitch of the external thread on the puller bar is 100.1% to 100.5% of the pitch of the mating thread in the studbolt.

18. A nut assembly for use with the coupling claimed in claim 14, the nut assembly comprising:

a nut body with a substantially conical or tapered peripheral outer surface;

an annular collar with a complementary conical or tapered recess to receive the nut body, in use; and the nut body being screwed, in use, on the studbolt into the recess of the annular collar.

19. A nut assembly as claimed in claim 18 and further including:

a base washer interposed between the annular collar and the article and having a substantially part-spherical face engageable by a complementary part-spherical face on the annular collar to enable the base washer and annular collar to be self-aligning.

20. A hydraulic tensioner for application with a stud bolt extending from an article and fitted with a cone nut and an outer annular collar radially surrounding said cone nut, said tensioner comprising:

a puller bar having a longitudinal axis and a tapered end tapered at an angle of about 10° to said longitudinal axis, said tapered end having an external thread for engagement in an internal thread in an end of the studbolt, said external and internal threads comprising buttress threads having a shoulder or flank lying substantially perpendicular to the longitudinal axis of the puller bar;

a puller buddy having an internally threaded end for engagement with an external thread on said end of the studbolt, and means on the puller bar for exerting a pulling force on the puller buddy when a pulling force is exerted on the puller bar; and an hydraulic means acting between the puller bar and the article via a bridge positioned around and over said cone nut and against the puller bar to pull the puller bar and puller buddy in a direction away from the article to tension the studbolt;

wherein, said bridge stands directly upon said outer annular collar in operation.

21. An hydraulic tensioner as claimed in claim 20, wherein:

the pitch of the external thread on the puller bar is greater than the pitch of the internal thread in the end of the studbolt.

22. An hydraulic tensioner as claimed in claim 21, wherein:

the pitch of the external thread on the puller bar is 3.005 mm and the pitch of the thread in the end of the studbolt is 3.00 mm.

23. A cone nut assembly within a hydraulic tensioner for applying tension to a studbolt extending from an article, wherein the tensioner includes a puller bar for connection with an end of the studbolt, and an hydraulic means acting via a bridge between the puller bar and article to exert a pulling force on the studbolt in a direction away from the article, said cone nut assembly comprising:

a cone nut body having an axial length and a substantially conical or tapered peripheral outer surface along a substantial portion of said axial length;

an outer annular collar radially surrounding said nut body and having a complementary conical or tapered recess to receive the cone nut body, in use;

the cone nut body being screwed, in use, on said studbolt and into the recess of the outer annular collar, and adapted to be adjusted along said studbolt and against said collar to take up elongation of the studbolt as a result of applying tension to it;

wherein, said bridge stands directly upon said outer annular collar in operation.

24. A washer for use between the cone nut body and article in the tensioner as claimed in claim 23, the washer comprising:

first and second annular means mating at a slip plane angle from a plane transverse to the axis of the washer; and removable or releasable means holding the first and second annular means against relative slip over the slip plane therebetween while the removable or releasable means is in place.

* * * * *

UNITED STATES PATENT AND TRADEMARK OFFICE

CERTIFICATE OF CORRECTION

PATENT NO. : 7,140,824 B2
APPLICATION NO. : 10/699948
DATED : November 28, 2006
INVENTOR(S) : John Wentworth Bucknell It is certified that error appears in the above-identified patent and that said Letters Patent is hereby corrected as shown below:

In column 8, Line 7, please delete "100" and insert --10°--.
In column 10, Line 63, please delete "the nut and article" and insert --the cone nut body and article--.
In column 10, Line 64, please delete "said" and insert --the--.
in column 10, Line 66, please delete "angled" and insert --angle--.

Signed and Sealed this

Eleventh Day of September, 2007

JON W. DUDAS
*Director of the United States Patent and Trademark Office*